Jan. 23, 1945. M. R. SHEEN 2,367,893
LIQUID PUMP
Filed May 8, 1943
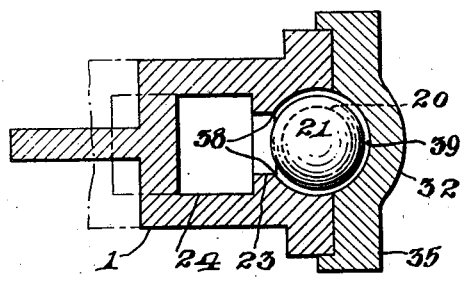
Fig. 3.
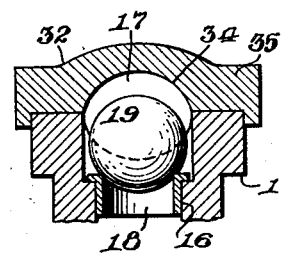
Fig. 4.
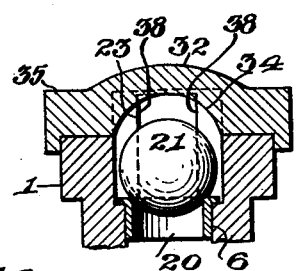
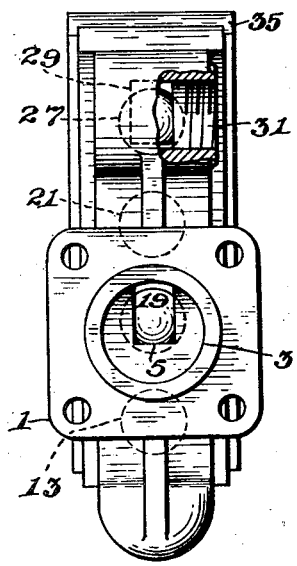
Fig. 2.
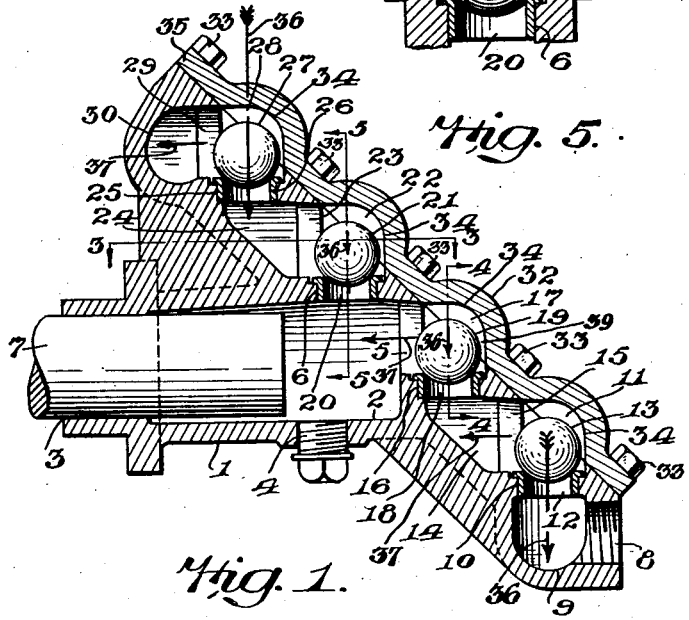
Fig. 5.
Fig. 1.
INVENTOR
MILTON R. SHEEN
BY J. Stuart Freeman
ATTORNEY Patented Jan. 23, 1945

2,367,893

UNITED STATES PATENT OFFICE 2,367,893

LIQUID PUMP

Milton Roy Sheen, Philadelphia, Pa.

Application May 8, 1943, Serial No. 486,117

9 Claims. (Cl. 103—153)

The object of the invention is to provide improvements in pumps broadly, but more particularly in a multi-valve pump, such as is especially adapted for use in the transmission of liquid chemicals and the like from place to place.

Another object is to provide a pump of this nature, comprising a plurality of valves upon both the intake and the discharge sides of the pump cylinder, and also to provide a cover that is common to at least a plurality of said valves, and preferably to all of them, while at the same time the entire path followed by liquids in passing through said pump is characterized by a complete freedom from gas-receiving pockets or recesses.

Still another object is to provide in such a pump the combination of a plurality of valves in stepped relation with one another upon each of the intake and discharge sides of a piston cylinder, each valve comprising a valve member which preferably but not necessarily includes a gravity-actuated ball or other loose member, movable within a chamber having a laterally directed outlet opening from said valve chamber through a transversely restricted passageway. The sides of the passageway, together with the walls of the chamber, operate to prevent the accidental escape of the valve member from its chamber upon the release of pressure beneath the valve while they also guide the valve member towards its seat.

With the objects thus briefly stated, the invention comprises further details of construction, which are hereinafter fully brought out in the following description, when read in conjunction with the accompanying drawing, in which Fig. 1 is a vertical section of a pump structure comprising one embodiment of the invention; Fig. 2 is a left end elevation of the same, partly in section; Fig. 3 is a section on the line 3—3 of Fig. 1; Fig. 4 is a section on the line 4—4 of Fig. 1; Fig. 5 is a section on the line 5—5 of Fig. 1. The pump construction herein described and claimed comprises an improvement over that shown in and covered by my Patent No. 2,263,429, while the application is a continuation-in-part of my application Serial No. 402,073, filed July 12, 1941.

Referring to the drawing, a valve casing is shown as comprising a body portion 1, into which extends preferably horizontally a substantially cylindrical piston chamber 2, defined in one direction by a relatively restricted aperture 3, which, if desired, may be sealed by any suitable form of stuffing box or the like, while the opposite end portion of said bore is provided with a drain aperture normally closed by a plug or the like 4, and inlet and outlet apertures 5 and 6, respectively to and from the bore. Extending into said primary bore through the aperture 3 is a reciprocatable piston 7 which may be actuated by any suitable prime mover mechanism or otherwise.

What will be termed the forward portion of the body 1 is crossed by a diagonally upwardly and rearwardly extending series of valve chambers, preferably with at least two gravity-actuated valves controlling the flow of liquids into said primary pump bore, while preferably at least two similar valves control the flow of liquid from said pump bore. The purpose of said valves broadly is to prevent a flow of liquid in the reverse direction both during operation of the piston and likewise while it is motionless or inoperative.

The lower forwardmost portion of the valve body is provided with an intake port 8, which may be threaded for connection by a pipe line (not shown) leading from any source from which liquid is to be pumped. This intake port opens inwardly into a passage 9, which in turn discharges through a cylindrical valve passageway 10, into a valve chamber 11, said passageway being provided with an annular valve seat 12, upon which rests a ball or equivalent form of preferably loosely positioned, gravity-actuated valve 13.

The valve chamber 11 opens into a diagonal connecting passageway 14 through a transversely restricted opening 15. The sides of the opening are adjacent to the seated position of the valve 13 and restrain said valve from being forced by the flow of liquid laterally out of substantial alignment with the axis of this seat, to which they return said valve, as it settles by gravity upon cessation of the flow of liquid. The connecting passageway 14 leads through a second cylindrical valve passage 16 into a second valve chamber 17, said last-mentioned passageway being provided with an annular valve seat 18, upon which rests a second valve member 19, preferably similar to the construction and operation of the first member 13.

The second valve chamber 17 opens into the piston bore by way of the inlet port 5, which forms a connecting passageway and which is transversely restricted for the same purpose as the restricted opening 15, hereinbefore referred to. These two valve members 13 and 19 operate to prevent the reverse flow of liquid from within the piston chamber 2 downwardly towards the intake port 8, while at the same time permitting a substantially free flow of liquid from said intake towards and into said piston chamber during the outward stroke of said piston.

The outlet aperture 6 from said piston bore forms a valve passageway and is provided with an annular valve seat 20, upon which rests a third ball or equivalent valve 21 within a valve chamber 22, which in turn leads through a transversely restricted opening 23 into a connecting passageway 24. From the passageway 24 the liquids flowing from said piston bore, during the inward stroke of said piston, flow through a valve passageway 25 provided with an annular valve seat 26, supporting a fourth ball or equivalent valve member 27, within a valve chamber 28.

The connecting passageway 24 communicates thru a transversely restricted opening 29 with an angularly directed connecting passageway or chamber 30, provided with a preferably laterally directed discharge port 31. The structure, if desired, may be threaded to receive a pipe connection leading toward any desired point to which the liquid impelled by the pump is to be transferred. With this construction, it will be seen that the two valve members 21 and 27 cooperate to prevent the reverse flow of a liquid from the higher elevation of the discharge port 31 into the piston chamber 2, in a manner similar to the operation of the two first-mentioned valves 13 and 19, as hereinbefore referred to.

From Fig. 1 it will also be seen that in this embodiment of the invention a single cover plate 32, secured in position by bolts and nuts or other suitable fastening means 33, serves to simultaneously cover, enclose and protect all of said valve members, while recesses 34 upon the inner surface of said plate cooperate to form portions of the walls of the respective valve chambers 11, 17, 22 and 28. However, if desired, two or more independently detachable cover plates may be employed, in which case one or more valves may be exposed, cleaned and replaced or changed, without opening and exposing any of the interiors of the other valve chambers.

By providing a pathway through the pump that is characterized by a complete freedom of gas-receiving pockets, a much more efficient steady flow of liquid is assured. In fact, such a construction provides for a flow that is in exact accordance with the pulsations of the reciprocating piston 7, as otherwise the compressibility of air or other gas within pockets in the pump would absorb some of the force of the piston, and proportionately negative its effectiveness.

One of the considerable advantages of the common plane of separation between the valve body 1, and the cover 35 lies in the complete accessibility of the interior chambers and passageways when the cover is removed, permitting cleaning to the best advantage.

Assuming the valve cover 35 to have been removed, and for convenience of reference, assuming vertical direction of flow through the valves it will be seen from the vertical arrows 36 that there is complete access to the vertical valve passageways and chambers because the spaces above the valve seats and axially in line with them are open to a width toward the valve body substantially corresponding with the sizes of the valve passageways.

From the horizontal arrows 37 it will be apparent also that removal of the cap gives complete access to all of the horizontal connecting passageways since when the cover is removed it leaves the spaces open horizontally in line with the diagonal (horizontal) passageways for cleaning these passageways and for any attention which they may require.

This contributes to the ease and therefore effectiveness of thorough access, cleaning and control of the entire valve structure.

It will further be evident that the facing inner edges of the restricting openings 5, 15, 23 and 29 effectively guide the gravity valves as they lift and insure control of their return movements, permitting balls, when used as these gravity valves, to roll upon the facing edges 38 of these walls, allowing predetermined play to the left in Figure 1 from the closed position of the balls and guiding the balls back nearly into line with the seats upon which the balls rest. The predetermined play is to the left when the balls lift, as compared with the play around the balls seen at 39 in Figures 1 and 3.

For convenience in claiming I refer to the opening and closing directions of valve movement calling attention however to the fact that these two directions of movement are parallel and coincide except that one is moving away from the seat and the other is moving toward the seat; and that a plane which is diagonal to the one is, of course, diagonal to the other.

The directions of opening movements of the valves are the directions of fluid flow along the lengths (axially) of the valve passageways and the directions of fluid flow through the connecting passageways are the directions of their center line lengths.

Having thus described my invention, what I claim and desire to protect by Letters Patent of the United States is:

1. A pump, comprising a casing having a piston bore provided with inlet and outlet apertures, said casing also having intake and discharge ports, a plurality of valve passageways and valve members between said intake port and said inlet aperture and also between said outlet aperture and said discharge port, each valve member being within an independent chamber, connecting passageways between the chambers of each plurality and the next valve passageway or port, the casing terminating in a plane diagonal to the lengths of the passageways, through which plane all of the chambers open, and removable cover means fitting said diagonal plane to close said chambers, the several chambers and connecting passages being free from gas-receiving recesses or pockets.

2. A pump, comprising a casing having a piston bore provided with an inlet aperture and an outlet aperture, said casing also having a plurality of intake valve passageways and a plurality of discharge valve passageways, a plurality of valve members respectively for said intake valve passageways and for said discharge valve passageways, each valve member being within an independent chamber, connecting passageways between the chambers of the plurality of valve members and the valve passageways, all of said passageways and chambers opening through a common plane diagonal to the direction of valve movement, and removable cover means contiguous to said diagonal plane and common to all of said chambers, whereby entry is permitted to the valve passageways and connecting passageways in the directions of their lengths.

3. A pump, comprising a casing having a piston bore provided with inlet and outlet apertures, said casing also having intake and discharge ports, valve passageways and valve closures therefore between said inlet and outlet apertures and said inlet and discharge ports, an independent chamber for each valve closure, the casing terminating in a plane diagonal to the opening and closing direction of movement of the valve closures, through which plane all of the chambers open directly in line with both apertures and passageways, a removable cover plate for said diagonal plane surface, closing the chamber openings, whereby when the bore is horizontal entry is permitted to the valve chambers in both vertical and horizontal directions and to the apertures and passageways lengthwise of the centers.

4. A pump, comprising a casing having a piston bore provided with inlet and outlet apertures, said casing also having intake and discharge ports, a valve opening and closure therefor between said intake port and said inlet aperture, a second valve opening and closure therefor between said outlet aperture and said discharge port, walls forming an independent chamber for each valve closure, said chambers, when the piston bore is horizontal, opening in both approximately horizontal and approximately vertical directions through a common plane surface diagonal to the opening and closing directions of movement of the valve closures, and removable cover means for closing the chamber openings, whereby entry is permitted to the valve chambers in both approximately horizontal and approximately vertical directions upon removal of said cover means.

5. A pump, comprising a casing having a piston bore provided with inlet and outlet apertures, said casing also having intake and discharge ports, a valve passageway and closure therefor between said intake port and said inlet aperture, a second valve passageway and closure therefor between said outlet aperture and said discharge port, walls forming an independent chamber for each valve closure, said chambers, when the piston bore is horizontal, opening in both approximately horizontal and approximately vertical directions through a common plane surface diagonal to the opening and closing directions of movement of the valve closures, and removable cover means for closing the chamber openings, engaging the casing at said plane, whereby entry is permitted to the valve chambers in both approximately horizontal and approximately vertical directions upon removal of said cover plate, part of the wall of each independent chamber being provided by a recess within the cover means.

6. A pump, comprising a casing having a piston bore provided with inlet and outlet apertures, said casing also having intake and discharge ports, a plurality of valve passageways and closures therefor between said intake port and said inlet aperture and also a plurality of valve passageways and closures therefor between said outlet aperture and said discharge port, each valve closure being within an independent chamber, connecting passageways between the chambers of each plurality and the next valve passageway, the casing terminating in a plane diagonal to the passageways through which plane all of the said passageways open in the directions of fluid flow along the lengths of the passageways or the reverse thereof, and removable cover means fitting said diagonal plane, common to all of said passageways and chambers and adapted to close the passageways and chambers, whereby upon removal of the cover plate entry is permitted to the passageways and in the directions of fluid flow or the reverse thereof, the several chambers and passageways being free from gas retaining pockets.

7. A pump, comprising a casing having a piston bore provided with an inlet aperture and an outlet aperture, said casing also having an intake port and a discharge port, a plurality of valve passageways between said intake port and said inlet aperture, each including a seat and a closure therefor, a second plurality of valve passageways between said outlet aperture and said discharge port, each including a seat and a closure therefor, each valve closure being within an independent chamber, connecting passageways between the chambers of each plurality and said valve passageways, the casing terminating in a plane diagonal to said passageways, through which plane all of said valve passageways, connecting passageways and chambers are accessible in the direction of their lengths and removable cover means for said casing, joined to the casing at such diagonal plane and including parts of said independent chambers, the entire path followed by the liquid through the pump being characterized by freedom from gas recesses or pockets.

8. A pump, comprising a casing, a piston and a piston bore provided with an inlet aperture and an outlet aperture, said casing having a plurality of intake valve passageways and a plurality of discharge valve passageways, which are approximately vertical when the piston bore is horizontal, a plurality of valve members respectively for said inlet and outlet valve passageways, each valve member being within an independent chamber, connecting passageways between the chambers and the valve passageways, which are approximately horizontal when the piston bore is horizontal, all of said valve passageways, connecting passageways and chambers opening in the directions of the lengths of the passages, or the reverse thereof through a common plane diagonal to the direction of valve movement, and removable cover means contiguous to said diagonal plane and common to all of said chambers whereby entry is permitted to the valve passageways and connecting passageways in vertical and horizontal directions respectively upon removal of the cover plate.

9. A pump comprising a casing having a piston bore provided with inlet and outlet apertures, said casing also having intake and discharge ports, valved passageways between said intake port and the bore and between the bore and said discharge port, an independent chamber for each valve, open away from the valve, connecting passageways between the independent chambers and the piston bore and discharge port respectively, and cover means for the open parts of the independent chambers having a plane of partition from the rest of the pump diagonal to the directions of flow through said passageways and, when removed, giving access lengthwise through the several passageways from directions in line with the passageways.

MILTON ROY SHEEN.